United States Patent
Morales Espejel et al.

(10) Patent No.: US 8,360,650 B2
(45) Date of Patent: Jan. 29, 2013

(54) METHOD FOR LUBRICATING A ROLLING ELEMENT BEARING BY MEANS OF AN ULTRA LOW VISCOSITY VOLATILE FLUID, AND BEARING ARRANGEMENT

(75) Inventors: Guillermo Enrique Morales Espejel, IJsselstein (NL); Hans Wallin, Lansdale, PA (US); Goran Lindsten, Gothenburg (SE)

(73) Assignee: AB SKF, Gothenburg (SE)

( * ) Notice: Subject to any disclaimer, the term of this patent is extended or adjusted under 35 U.S.C. 154(b) by 859 days.

(21) Appl. No.: 11/915,998

(22) PCT Filed: May 23, 2006

(86) PCT No.: PCT/EP2006/004910
§ 371 (c)(1), (2), (4) Date: Jul. 21, 2008

(87) PCT Pub. No.: WO2006/128617
PCT Pub. Date: Dec. 7, 2006

(65) Prior Publication Data
US 2008/0310781 A1    Dec. 18, 2008

(30) Foreign Application Priority Data
May 31, 2005  (EP) .................................... 05104667

(51) Int. Cl.
*F16C 19/00*   (2006.01)
*F01D 11/00*   (2006.01)
(52) U.S. Cl. ......... 384/473; 384/462; 384/471; 415/111
(58) Field of Classification Search ............. 384/462, 384/467, 471, 473, 474, 475, 606; 415/111; 184/5, 5.1
See application file for complete search history.

(56) References Cited

U.S. PATENT DOCUMENTS

| | | | |
|---|---|---|---|
| 1,269,436 A * | 6/1918 | Heyman | 384/606 |
| 3,542,442 A * | 11/1970 | Kent | 384/473 |
| 3,645,643 A * | 2/1972 | King et al. | 415/111 |
| 4,733,978 A * | 3/1988 | Colanzi et al. | 384/482 |
| 5,050,389 A | 9/1991 | Wigmore et al. | |
| 5,727,469 A | 3/1998 | Mohrmann | |
| 5,881,564 A | 3/1999 | Kishimoto et al. | |
| 6,279,340 B1 * | 8/2001 | Butterworth et al. | 62/468 |
| 6,357,922 B1 * | 3/2002 | Harbottle et al. | 384/466 |
| 7,044,643 B2 * | 5/2006 | Greubel | 384/475 |
| 7,458,728 B2 * | 12/2008 | Kitamura et al. | 384/462 |
| 2001/0037651 A1 | 11/2001 | Butterworth et al. | |
| 2004/0184687 A1 | 9/2004 | Morales et al. | |

FOREIGN PATENT DOCUMENTS
EP    1 522 751 A1    4/2005

OTHER PUBLICATIONS
Form PCT/ISA/210 (International Search Report) dated Oct. 17, 2006.

* cited by examiner

*Primary Examiner* — James Pilkington
(74) *Attorney, Agent, or Firm* — Buchanan Ingersoll & Rooney PC

(57) ABSTRACT

A method for lubricating a rolling element bearing by an ultra low viscosity volatile fluid comprises injecting a liquefied fluid flow into the bearing, lubricating rolling contacts between the rings and the rolling elements of the bearing by the liquefied fluid, providing a flow restriction for the liquefied fluid so as to maintain at least part of the fluid at a pressure which is above the evaporation pressure which is defined by evaporation of the fluid at the temperature or temperatures which prevail(s) in the bearing.

14 Claims, 2 Drawing Sheets

METHOD FOR LUBRICATING A ROLLING ELEMENT BEARING BY MEANS OF AN ULTRA LOW VISCOSITY VOLATILE FLUID, AND BEARING ARRANGEMENT

BACKGROUND

The invention is related to the field of using ultra low viscosity volatile fluids (ULWF) as lubricant for rolling element bearings in general, and in particular in a refrigeration compressor. In this connection, for instance a liquefied refrigerant is supplied from the condenser to the bearing space in the bearings. The refrigerant which enters the bearing space is at saturation condition and is sprayed onto the bearing races and the rolling elements. The pressure of the liquefied lubricant drops in this process, as a result of which some of the lubricant may evaporate. The remaining liquid lubricant is maintained at saturation level. Thus, despite the fact that ULVVF's are fluids with a low boiling point and low viscosity, studies have revealed that they are nevertheless able to produce a lubricant film.

However, it appears that an ULVVF lubricant film is very thin in comparison to an oil based lubricant film due to said low viscosity and also due to low pressure-viscosity coefficients. A further problem in this connection is that, more often than not, within the bearing boiling or flashing occurs of the ULWF's, such as refrigerants, which are used as lubricants. This is caused by a decrease of the pressure or by the addition of energy, such as caused by frictional heat. In those cases, the bearing will run dry in an intermittent fashion, depending on said pressure decrease or added energy. Furthermore, flashing or boiling can also lead to cavitation at the entrance or the exit of the rolling contacts in the bearing. As a result of these phenomena, high contact shear stresses will occur which in the end lead to a reduced bearing life.

SUMMARY

The object of the invention is to provide a method for lubricating a bearing by means of an ULWF which does not have these disadvantages. This object is achieved by a method for lubricating a rolling element bearing by means of an ultra low viscosity volatile fluid (ULVVF) comprising the steps of:
injecting a liquefied fluid flow into the bearing,
lubricating the rolling contacts between the rings and the rolling elements of the bearing by means of the liquefied fluid,
providing a flow restriction for the liquefied fluid so as to maintain at least part of the fluid at a pressure which is above the evaporation pressure as is defined by evaporation of the fluid at the temperature or temperatures which prevail(s) in the bearing (subcooling).

The step of providing a restriction in the flow path of the lubricant leads to a relative pressure increase of said lubricant. Such pressure increase may be just sufficient to prevent evaporation of the liquefied ULVVF which is injected in to the bearing as lubricant. The liquid state of the ULVVF is thus prolonged, with the beneficial effect of improved lubrication and avoidance of dry running phenomena.

According to a preferred way of carrying out the method, it comprises the steps of:
providing a bearing cavity,
accommodating the bearing in the bearing cavity,
injecting the liquefied fluid into the bearing cavity,
making the liquefied fluid flow through the bearing,
delimiting the bearing cavity by a flow restriction. The bearing cavity is defined as a room or area within which one or more rolling element bearings are accommodated. The bearing cavity should be distinguished from the bearing space, which is the area defined between the rings of a rolling element bearing and in which the rolling elements and possible cage(s) are located.

The flow restriction addressed before can take several forms. According to a first possibility, the rolling element bearing itself can be used as a flow restriction. Alternatively, a shield or seal may be applied at the fluid flow outlet side of the bearing, while using said shield or seal as a flow restriction.

The invention furthermore comprises the steps of:
accommodating a further bearing in the bearing cavity,
injecting the liquefied fluid in the bearing cavity defined between the two bearings,
making the liquefied fluid flow through the bearings,
delimiting the bearing cavity by flow restrictions at both bearings.

In particular, the invention can be used for lubricating a rolling element bearing in a refrigerant compressor used in a refrigerating cycle, wherein a refrigerant flow is compressed and liquefied in a condenser while generating a temperature increase and subsequently the main part of said refrigerant flow is evaporated in an evaporator while generating a temperature decrease, comprising the steps of:
obtaining an auxiliary part of the refrigerant flow from the condenser at condenser outlet pressure and in liquefied form,
increasing the pressure of said liquefied auxiliary part of the refrigerant flow to an increased pressure which is higher than the condenser outlet pressure,
supplying said increased pressure liquefied auxiliary part of the refrigerant flow to said bearing for lubrication thereof,
delimiting the bearing space by a flow restriction.

By the step of increasing the pressure of said liquefied auxiliary part of the refrigerant flow and thereby subcoolin the liquid refrigerant, several advantages are obtained. First of all, the boiling or flashing of the liquefied lubricant in the bearing is delayed having regard to the fact that a larger temperature difference has to be overcome in comparison to the prior art. Thus, a larger amount of liquefied lubricant can be maintained for longer periods within the bearing. Furthermore, the step of subcooling increases the viscosity of the refrigerant and thereby the thickness of the lubricant film. Moreover, it is easier to pump the subcooled refrigerant since pump cavitation can be avoided.

The supply of pressurized refrigerant and maintaining the pressure for a time span which is sufficient for a proper lubrication effect, can be obtained by delimiting the bearing space of the bearing by a flow restricting member. The invention is furthermore related to a bearing arrangement for a refrigerant compressor, said arrangement comprising a housing, at least one bearing accommodated in said housing for supporting a compressor shaft, said bearing comprising at least two ring elements as well as at least one series of rolling elements which are in rolling contact with said rings, said rings defining a bearing space, as well as liquid refrigerant supply means for supplying a liquid refrigerant flow into the bearing space. According to the invention, at least one flow restriction member is provided which delimits the bearing space.

Said flow restriction member can be carried out in several ways. According to a first possibility, the flow restriction member is a seal connected to one of the rings and extending towards the other ring. Said seal can slidably engage the other ring. Furthermore, the seal may be elastically deformable under the influence of the increased pressure liquefied auxiliary part of the refrigerant flow. By selecting a proper elasticity for the seal, a certain pressure can be maintained in the bearing space.

Alternatively, the flow restriction member can be a shield connected to one of the rings and extending towards the other ring. The gap between the shield and the opposite ring provides a choking effect, which enables a specific pressure build up within the bearing space.

According to a further embodiment, at least two bearings can be mounted in a common housing and supporting a common shaft, said bearings, housing and shaft enclosing a cavity which at both ends is delimited by a flow restriction, the liquid refrigerant supply means emanating in the cavity.

BRIEF DESCRIPTION OF THE DRAWINGS

The invention will now be described further with reference to the embodiments shown in the drawings.

DETAILED DESCRIPTION

Figure 1:
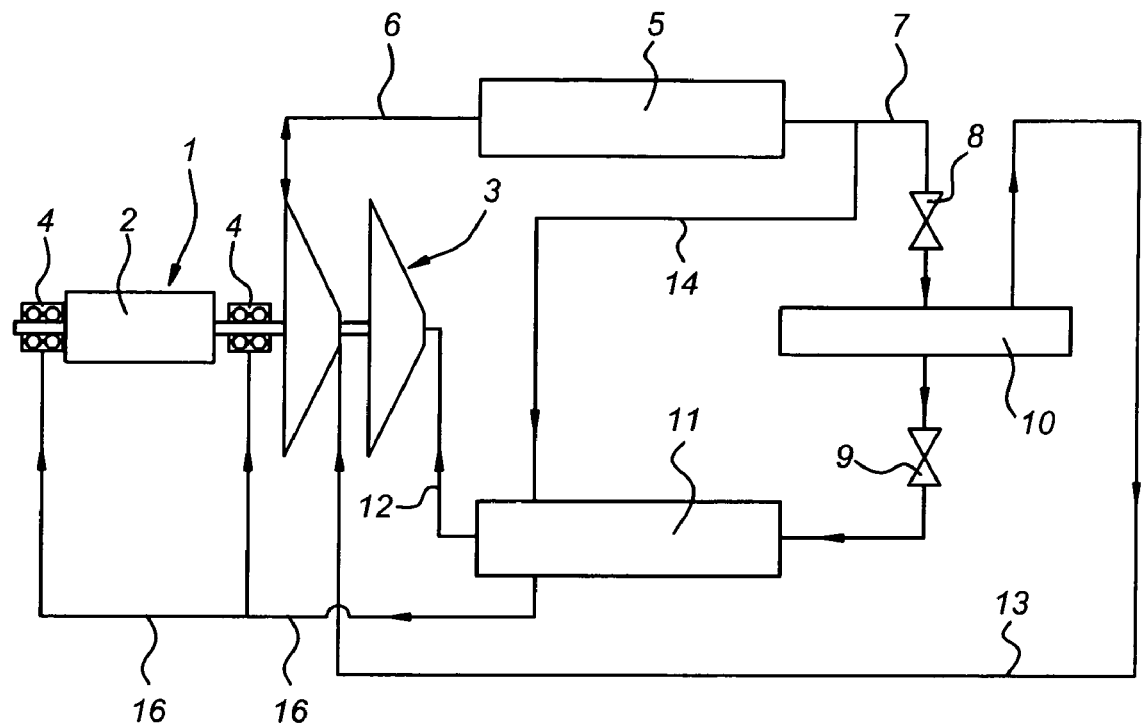
FIG. 1 shows an embodiment of a refrigeration installation according to the invention.

The refrigeration installation as shown in FIG. 1 comprises a compressor which is identified by reference numeral 1. Said compressor 1 comprises a motor 2 as well as compressor means 3 which have been schematically shown. The motor 2 comprises a stator and rotor (not shown in detail), which rotor is supported by means of bearing arrangements 4, 4'.

Furthermore, the installation comprises a condenser 5, which is supplied with pressurized gaseous refrigerant through line 6. In the condenser 5, the pressurized gaseous refrigerant is liquefied while releasing temperature.

Through line 7, which contains the reducing valves 8, 9 as well as economizer 10, the refrigerant is fed to the evaporator 11. In the evaporator 11, the liquefied refrigerant is evaporated while extracting heat from the environment. The gaseous refrigerant is then returned to the compressor means 3 through line 12.

In a well known way, the liquid refrigerant pressure is reduced by the first pressure reducing valve 8, and subsequently the liquid refrigerant is fed, via economizer 10, to a second pressure reducing valve 9. Any gaseous refrigerant is fed from the economizer 10 through line 13 to the compressor means 3.

According to the invention, an auxiliary flow of liquid refrigerant from the condenser 5 is fed through the auxiliary line 14 to the bearing surfaces in the bearings 4, whereby boiling or flashing is prevented or postponed. Thus, a much better lubrication behavior is obtained, as will be explained with reference to FIG. 2.

Figure 2:
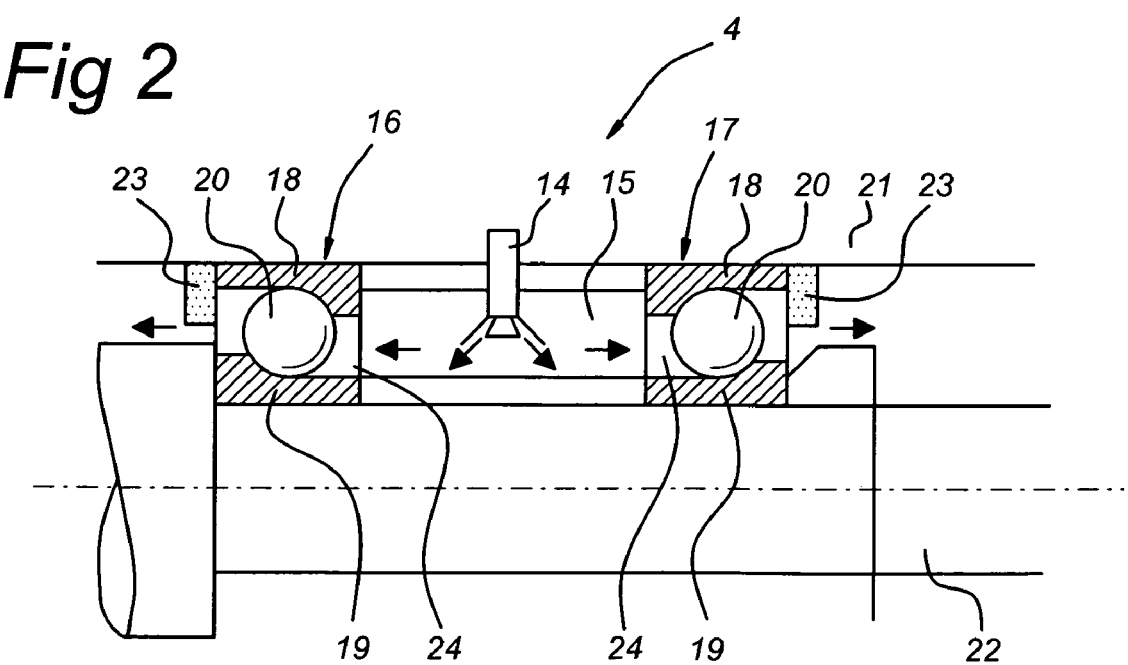
FIG. 2 shows an alternative embodiment.
Figure 3:
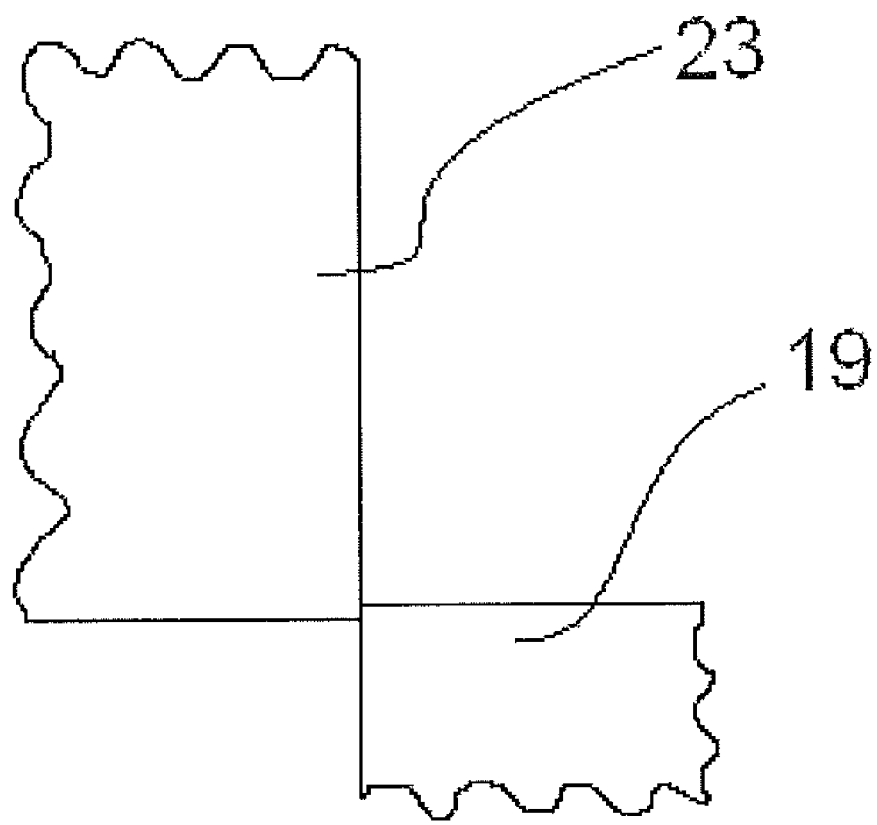

As shown in FIG. 2, the liquid is injected through a nozzle 14 in the bearing cavity 15 which is present between the two bearings 16, 17 of the bearing arrangement 4'. Said bearings 16, 17 each comprise an outer ring 18, an inner ring 19 defining a bearing space 24 and a series of balls 20 contained in said bearing space 24. The outer rings 18 are accommodated in a motor housing 21, and the inner rings 19 support the motor shaft 22. The outer rings 18 each carry a flexible or rigid seal 23. The outer ring 18 and the inner ring 19 of the bearing 16 define a first passageway. The outer ring 18 and the inner ring 19 of the bearing 17 define a second passageway.

The fluid injected in the bearing cavity 15 defined between the bearings 16, 17, the motor housing 21 and the shaft 22 has an increased pressure, whereby evaporation of the fluid is prevented or postponed so as to ensure a proper lubrication of the rolling element 20 and the rings 18, 19 by the refrigerant liquid.

The seals 23 are selected in such a way that they prevent a rapid decrease of the pressure of the liquid in the bearing cavity 15. To that end, the seal may be rigid, flexible or semi-rigid. Also the series of balls 23 themselves together with a possible cage (not shown) both a flow restriction for maintaining a certain overpressure in the bearing space.

The invention claimed is:

1. A method for lubricating a rolling element bearing by an ultra low viscosity volatile fluid comprising:
    injecting an ultra low viscosity volatile fluid flow into the bearing, the bearing comprising a first set of rings and first rolling elements positioned between the first set of rings, and a second set of rings and second rolling elements positioned between the second set of rings;
    lubricating rolling contact between the first set of rings and the first rolling elements with a first portion of the ultra low viscosity volatile fluid flow;
    lubricating rolling contact between the second set of rings and the second rolling elements with a second portion of the ultra low viscosity volatile fluid flow; and
    restricting the ultra low viscosity volatile fluid flow with a first flow restriction and a second flow restriction so as to maintain at least part of the ultra low viscosity volatile fluid flow at a pressure which is above an evaporation pressure defined by evaporation of the ultra low viscosity volatile fluid flow at a temperature or temperatures which prevail(s) in the bearing, the first flow restriction comprises a first shield positioned at a first outlet of the bearing so that the first flow restriction restricts the first portion of the ultra low viscosity volatile fluid flow lubricating the rolling contact between the first set of rings and the first rolling elements, and the second flow restriction comprises a second shield positioned at a second outlet of the bearing so that the second flow restriction restricts the second portion of the ultra low viscosity volatile fluid flow lubricating the rolling contact between the second set of rings and the second rolling elements.

2. The method according to claim 1, wherein the bearing is provided in a bearing cavity, the method further comprising:
    injecting the liquefied fluid into the bearing cavity;
    making the liquefied fluid flow through the bearing; and
    delimiting the bearing cavity by the first flow restriction and the second flow restriction.

3. The method according to claim 1, wherein the lubrication of a rolling element bearing comprises lubricating a rolling element bearing arrangement in a refrigerant compressor used in a refrigerating cycle, wherein the ultra low viscosity volatile fluid is compressed and liquefied in a condenser while generating a temperature increase and subsequently a main part of the ultra low viscosity volatile fluid is evaporated in an evaporator while generating a temperature decrease, the method further comprising:
    obtaining an auxiliary part of the ultra low viscosity volatile fluid from the condenser at a condenser outlet pressure and in liquefied form;
    increasing the pressure of said liquefied auxiliary part of the ultra low viscosity volatile fluid to an increased pressure which is higher than the condenser outlet pressure;
    supplying said increased pressure of the liquefied auxiliary part of the ultra low viscosity volatile fluid to said bearing arrangement for lubrication of the bearing arrangement; and wherein the bearing arrangement comprises a bearing cavity, said bearing cavity being delimited by a flow restricting member, the method further comprising supplying the liquefied auxiliary part of the ultra low viscosity volatile fluid into the bearing cavity.

4. The method according to claim 1, wherein the first flow restriction restricts the first portion of the ultra low viscosity volatile fluid flow as the first portion of the ultra low viscosity volatile fluid flow passes to an exterior of the rolling element bearing, and the second flow restriction restricts the second portion of the ultra low viscosity volatile fluid flow as the second portion of the ultra low viscosity volatile fluid flow passes to the exterior of the rolling element bearing.

5. A bearing arrangement for use in the method according to claim 1, comprising a housing, said bearing being accommodated in said housing, said bearing comprising a bearing space which is delimited by the first flow restriction and the second flow restriction.

6. The bearing arrangement according to claim 5, wherein the first shield is connected to one of the rings of the first set of rings and extends towards an other ring of the first set of rings.

7. The bearing arrangement according to claim 6, wherein the bearing arrangement is in a refrigerant compressor used in a refrigerating cycle in which the ultra low viscosity volatile fluid is compressed and liquefied in a condenser, with a main part of the ultra low viscosity volatile fluid from the condenser being evaporated in an evaporator while a liquefied auxiliary part of the ultra low viscosity volatile fluid from the condenser is increased in pressure, wherein the first shield and the second shield are elastically deformable under the influence of the increased pressure of the liquefied auxiliary part of the ultra low viscosity volatile fluid.

8. The bearing arrangement according to claim 5, wherein said bearing supports a shaft and is positioned in a cavity of the housing, the cavity being delimited at respective ends of the cavity by the first flow restriction and the second flow restriction, and further comprising liquid refrigerant supply means emanating in the cavity for supplying the ultra low viscosity volatile fluid flow.

9. The bearing arrangement according to claim 5 for a refrigerant compressor, said bearing being accommodated in said housing for supporting a compressor shaft, the first set of rings and the second set of rings defining a bearing space, and further comprising liquid refrigerant supply means for supplying a liquid refrigerant flow as the ultra low viscosity volatile fluid flow into the bearing space defined between the first set of rings and the second set of rings, said first flow restriction delimiting the bearing space.

10. A bearing arrangement comprising:
a housing;
a shaft extending through the housing;
a first bearing accommodated in the housing, the first bearing comprising a first outer ring, a first inner ring, first rolling elements positioned between the first inner ring and the first outer ring, and a first outlet;
a second bearing accommodated in the housing, the second bearing comprising a second outer ring, a second inner ring, second rolling elements positioned between the second inner ring and the second outer ring, and a second outlet;
a bearing cavity defined within the housing;
a source of ultra low viscosity volatile fluid;
the housing being provided with a nozzle connected to the source of ultra low viscosity volatile fluid and communicating with the bearing cavity to introduce the ultra low viscosity volatile fluid into the bearing cavity to lubricate the first bearing and the second bearing, the ultra low viscosity volatile fluid moving from the bearing cavity through at least one of the first and second bearings to an exterior of the bearing arrangement; and
a first flow restriction and a second flow restriction to maintain at least part of the ultra low viscosity volatile fluid at a pressure which is above an evaporation pressure defined by evaporation of the ultra low viscosity volatile fluid at a temperature or temperatures prevailing in the bearing arrangement, the first flow restriction comprising a first shield positioned at the first outlet so that a first portion of the ultra low viscosity volatile fluid passes through the first flow restriction before the first portion of the ultra low viscosity volatile fluid reaches the exterior, and the second flow restriction comprising a second shield positioned at the second outlet so that a second portion of the ultra low viscosity volatile fluid passes through the second flow restriction before the second portion of the ultra low viscosity volatile fluid reaches the exterior.

11. Bearing arrangement according to claim 10, wherein the first shield is connected to the first outer ring and extends toward the first inner ring.

12. A bearing arrangement comprising:
a housing;
a shaft extending through the housing;
a bearing cavity defined within the housing;
a first bearing positioned inside the housing, the first bearing comprising a first passageway positioned between a first outer ring and a first inner ring, and first rolling elements positioned in the first passageway between the first inner ring and the first outer ring, the first passageway opening to the bearing cavity and opening to an exterior of the bearing arrangement at an outlet side of the first bearing;
a second bearing positioned inside the housing, the second bearing comprising a second passageway positioned between a second outer ring and a second inner ring, and second rolling elements positioned in the second passageway between the second inner ring and the second outer ring, the second passageway opening to the bearing cavity and opening to the exterior of the bearing arrangement at an outlet side of the second bearing;
a source of ultra low viscosity volatile fluid;
a nozzle connected to the source of ultra low viscosity volatile fluid for introducing the ultra low viscosity volatile fluid into the bearing cavity so that the ultra low viscosity volatile fluid moves from the bearing cavity into lubricating contact with the first rolling elements and the second rolling elements and then moves to the exterior of the bearing arrangement via at least one of the first passageway and the second passageway;
a first flow restriction member comprising a first shield positioned at the opening of the first passageway at the outlet side of the first bearing to at least partially cover the opening of the first passageway so that a width of the opening of the first passageway is reduced, the first flow restriction member allowing the ultra low viscosity volatile fluid to pass from the first passageway to the exterior of the bearing arrangement;
a second flow restriction member comprising a second shield positioned at the opening of the second passageway at the outlet side of the second bearing to at least partially cover the opening of the second passageway so that a width of the opening of the second passageway is reduced, the second flow restriction member allowing the ultra low viscosity volatile fluid to pass from the second passageway to the exterior of the bearing arrangement; and the first flow restriction member and the second flow restriction member maintaining at least part of the ultra low viscosity volatile fluid lubricating the first rolling elements and the second rolling elements at a pressure which is above an evaporation pressure defined by evaporation of the ultra low viscosity volatile fluid at a temperature or temperatures prevailing in the bearing arrangement.

13. The bearing arrangement of claim 12 wherein the first flow restriction member is spaced apart from the first inner ring.

14. The bearing arrangement of claim 12 wherein the second flow restriction member is spaced apart from the second inner ring.

* * * * *